(12) United States Patent
Teruyama

(10) Patent No.: US 7,213,130 B2
(45) Date of Patent: May 1, 2007

(54) INSTRUCTION ROLLBACK PROCESSOR SYSTEM, AN INSTRUCTION ROLLBACK METHOD AND AN INSTRUCTION ROLLBACK PROGRAM

(75) Inventor: Tatsuo Teruyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 10/449,082

(22) Filed: Jun. 2, 2003

(65) Prior Publication Data

US 2004/0168046 A1 Aug. 26, 2004

(30) Foreign Application Priority Data

Feb. 26, 2003 (JP) ............................ P2003-049933

(51) Int. Cl.
*G06F 9/38* (2006.01)
*G06F 9/22* (2006.01)

(52) U.S. Cl. ...................................... 712/218; 712/214

(58) Field of Classification Search ................ 712/218, 712/214, 217, 228, 233
See application file for complete search history.

(56) References Cited

U.S. PATENT DOCUMENTS

| | | | | | |
|---|---|---|---|---|---|
| 4,941,087 | A | * | 7/1990 | Kap ............................ 710/260 |
| 5,568,380 | A | * | 10/1996 | Brodnax et al. ................ 700/79 |
| 5,872,990 | A | * | 2/1999 | Luick et al. ..................... 712/24 |
| 5,928,355 | A | * | 7/1999 | Petolino, Jr. ................. 712/214 |
| 6,012,134 | A | * | 1/2000 | McInerney et al. ......... 711/207 |
| 6,192,466 | B1 | * | 2/2001 | Gschwind .................... 712/214 |
| 6,247,118 | B1 | * | 6/2001 | Zumkehr et al. ............ 712/228 |
| 6,460,133 | B1 | * | 10/2002 | Nunez et al. ................ 712/214 |
| 6,629,271 | B1 | * | 9/2003 | Lee et al. ...................... 714/49 |
| 6,665,792 | B1 | * | 12/2003 | Merchant et al. ............ 712/219 |
| 6,748,589 | B1 | * | 6/2004 | Johnson et al. .............. 717/150 |
| 6,751,711 | B1 | * | 6/2004 | de Buda ...................... 711/151 |
| 6,826,573 | B1 | * | 11/2004 | Sicaras et al. ............... 707/100 |
| 6,832,308 | B1 | * | 12/2004 | Sicaras et al. ............... 712/214 |
| 6,983,358 | B2 | * | 1/2006 | Elmer ......................... 712/219 |
| 2002/0174323 | A1 | * | 11/2002 | Biswas et al. ............... 712/220 |

FOREIGN PATENT DOCUMENTS

JP 5-120012 5/1993
JP 7-319693 12/1995

OTHER PUBLICATIONS

T. Sato, et al., Parallel Architectures, Algoithms and Networks, Proceedings International Symposium, pp. 78-85, "Comprehensive Evaluation of an Instruction Reissue Mechanism", 2000.
G. Hinton, et al., Intel Technology Journal Q1, pp. 1-13, "The Mircoarchitecture of the Pentium 4 Processor", 2001.

* cited by examiner

*Primary Examiner*—Eric Coleman
(74) *Attorney, Agent, or Firm*—Oblon, Spivak, McClelland, Maier & Neustadt, P.C.

(57) ABSTRACT

An instruction rollback processor system according to the present invention is provided. The instruction rollback processor system includes: an instruction window buffer storing a plurality of instructions not yet executed and are arranged in a predetermined order; a multiplexer receiving an output of the instruction window buffer; and a rollback unit connected between the output side of the multiplexer and another input of the multiplexer.

3 Claims, 13 Drawing Sheets

INSTRUCTION ROLLBACK PROCESSOR SYSTEM, AN INSTRUCTION ROLLBACK METHOD AND AN INSTRUCTION ROLLBACK PROGRAM

CROSS REFERRENCE TO RELATED APPLICATIONS

This application is based upon and claims the benefit of priority from prior Japanese Patent Application P2003-49933 filed on Feb. 26, 2003; the entire contents of which are incorporated by reference herein.

BACKGROUND OF THE INVENTION

1. Field of the Invention

This present invention relates to pipeline processing computer. In particular, it relates to an instruction rollback processor system, an instruction rollback method, and an instruction rollback program with low cost and high performance.

2. Description of the Related Art

In central processing units (CPU), since parallel processing speed increases as the number of stages of pipeline increases, an increased number of pipeline stages tends to be used. However, as the number of stages of the pipeline increases, restart time for the pipeline increases. This may lead to the shortcoming of the processing speed decreasing. When an out-of-order CPU cannot dispatch, when an instruction cannot be completely executed by an in-order CPU, or when a cache miss occurs during the execution of a load instruction, it is necessary to refill data and then re-issue instructions. Though there is a question whether instructions that may be re-issued can be terminated, those instructions are stored in an instruction window buffer in a conventional example. This operation is a part of rollback control. The load instruction and subsequent instructions have to be held and reserved for a predetermined time period, which is relevant to the depth of entry of the instructions.

With a conventional microprocessor system, re-issuing an instruction may be required due to an occurrence of data cache miss after that instruction has been issued. Conventionally, due to this, the instruction is kept within an instruction window buffer even after that instruction has been issued, and when it is determined that re-execution thereof is required, the instruction kept in the instruction window buffer is re-issued. This requires that the instruction should be stored in the instruction window buffer for a predetermined time period, creating a problem in which part of the instruction window buffer, which has a large cost per area, is occupied with entry and maintenance of the instruction.

SUMMARY OF THE INVENTION

According to a first aspect of the present invention, an instruction rollback processor system is provided in which an instruction window buffer storing a plurality of instructions that are not yet executed and are arranged in a predetermined order; a multiplexer receiving an output of the instruction window buffer; and a rollback unit connected between the output side of the multiplexer and another input of the multiplexer.

According to a second aspect of the present invention, an instruction rollback processor method is provided in which a rollbacking by rotating using a rollback unit, an instruction not yet executed loop-wise and by holding the instruction during an occurrence of a cache miss; repeating the rollbacking when the cache miss is not solved and the rollbacking is not completed normally; and an instruction re-issue step of issuing a rollback control signal to a multiplexer and issuing an instruction that is not yet executed from an instruction window buffer when the rollbacking is normally completed.

According to a third aspect of the present invention, an instruction rollback method implemented by an instruction rollback processor system having an instruction window buffer storing a plurality of instructions that are not yet executed and are arranged in a predetermined order, a multiplexer having an input side and an output side and inputs an output of the instruction window buffer, and a rollback unit connected to the multiplexer, the output of the rollback unit is connected to another input of the multiplexer, comprising: rollbacking by selecting the input side of the rollback unit when rolling back an instruction that is not yet executed; and re-issuing an instruction by selecting the input from the instruction window buffer when rolling back an instruction that is yet not executed.

According to a fourth aspect of the present invention, an instruction rollback processor method includes executing an instruction that is not yet executed and that is issued from an instruction window buffer; driving a cache refill circuit when a cache miss occurs, inactivating a load instruction and subsequent instructions in pipeline registers, and freezing the instruction window buffer in the state of the occurrence of the cache miss; returning to inactivating the load instruction and subsequent instructions when the operation of the cache refill circuit has been completed and a load instruction is positioned at a position just before the occurrence of the cache miss; rotating loop-wise an issued instruction issued from the instruction window buffer and holding the issued instruction when the operation of the cache refill circuit is not completed; and rotating loop-wise the issued instruction when the operation of the cache refill circuit has been completed and the load instruction is not positioned at the position just before the occurrence of the cache miss.

According to a fifth aspect of the present invention, an instruction rollback program for an instruction rollback processor system that executes an algorithm is provided and includes instructions configured to execute an instruction that is not yet executed and that is issued from an instruction window buffer; instructions configured to drive a cache refill circuit when a cache miss occurs, inactivating a load instruction and subsequent instructions within pipeline registers, and freezing the instruction window buffer in the state at the occurrence of the cache miss; instructions configured to return to the instruction configured to inactivate the load instruction and subsequent instructions when the operation of the cache refill circuit has been completed and the load instruction is positioned at a position just before the occurrence of the cache miss; instructions configured to rotate loop-wise issued instructions issued from the instruction window buffer and holding the issued instructions when the operation of the cache refill circuit is not completed; and instructions configured to rotate loop-wise the issued instructions when the operation of the cache refill circuit has been completed and the load instruction is not positioned at the position just before the occurrence of the cache miss.

DETAILED DESCRIPTION OF THE EMBODIMENTS

Figure 1:
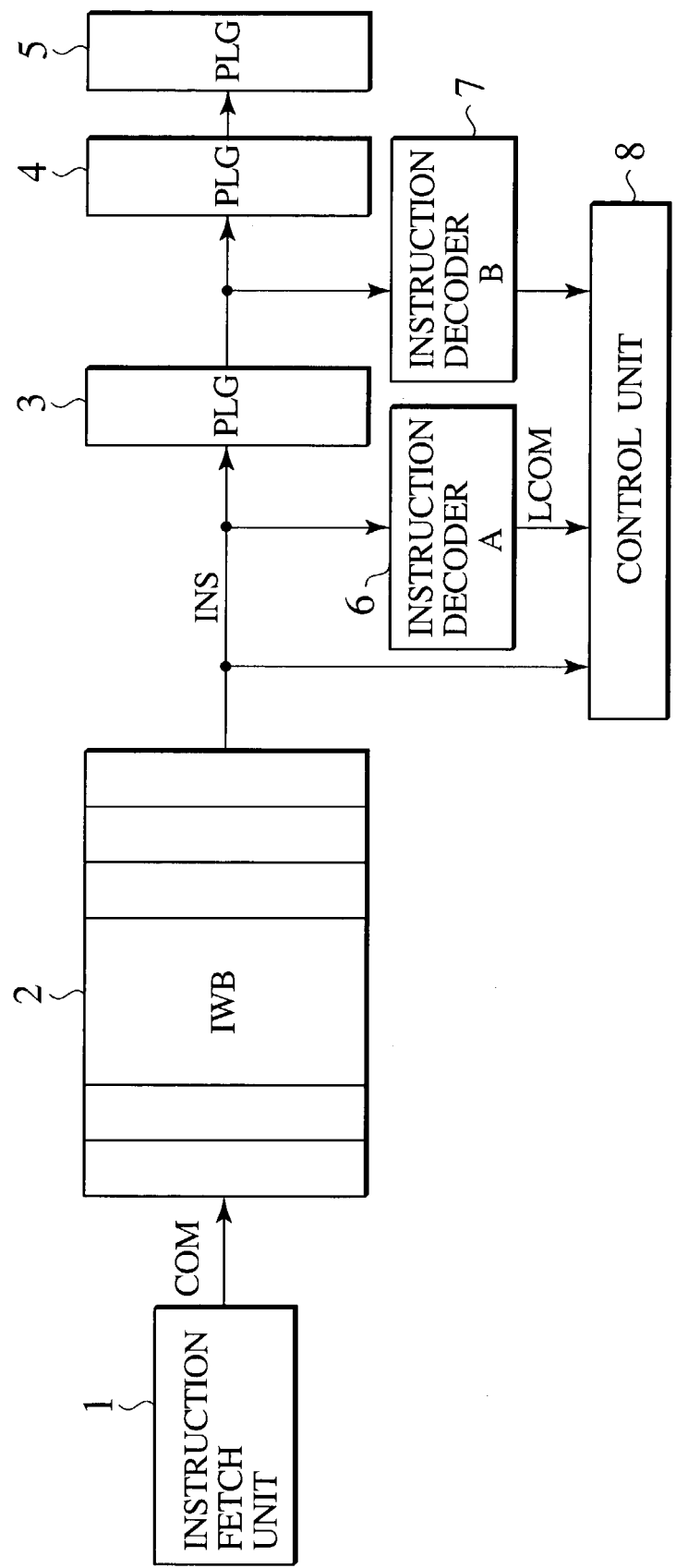
FIG. 1 is a schematic block diagram of a comparative example of a microprocessor system.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of the circuit blocks, it is appreciated that the various drawings are not drawn to scale from one figure to another nor inside a given figure, and in particular that the circuit diagrams are arbitrarily drawn for facilitating the reading and understanding of the drawings.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

COMPARATIVE EXAMPLE

The configuration of a microprocessor, which is a comparative example of the present invention, as shown in FIG. 1, includes an instruction fetch unit 1, an instruction buffer (IWB) 2, a first instruction decoder 6, a second instruction decoder 7, pipeline registers (PLGs) 3, 4, and 5, and a control unit 8.

An instruction command COM is issued from the instruction fetch unit 1 to the IWB 2 and held there. When a data hazard and a resource hazard are solved, the IWB 2 issues an instruction INS. The instruction INS is issued to the control unit 8, the PLGs 3, 4, and 5, the first instruction decoder 6, and the second instruction decoder 7, and the instruction INS passes through the execution pipeline and is executed at each stage thereof. The control unit 8 receives a load instruction LCOM from the first instruction decoder 6, a signal from the second instruction decoder 7, and an instruction INS from the IWB 2. The control unit 8 is made up of a known general purpose register (GPR) file, a function unit, a data cache unit, a bypass network, a bypass control block, and pipeline registers, etc. With this configuration, a load instruction LCOM, for example, accesses the data cache unit within the control unit 8 and fetches data; however, if a cache miss occurs, that data cannot be obtained. In this case, executions of that load instruction LCOM and subsequent instructions are canceled. After data is obtained by accessing a level 2 (L 2) cache, etc. and fetching the data, a load instruction LCOM and subsequent instructions are re-issued from the IWB 2 and re-executed. Since a cache hit should occur this time, continuous execution of subsequent instructions is possible.

At this time, since the load instruction and subsequent instructions are re-issued, they have to be stored in the IWB 2 in advance. Moreover, since it takes several cycles after re-issue of each instruction to determine that a load miss has occurred, that instruction is kept stored in the IWB 2 during these cycles. Even though a cache hit occurs during these cycles, since it is impossible to know that the cache hit occurs, the issued instruction has to be kept stored in the IWB 2.

Figure 2:
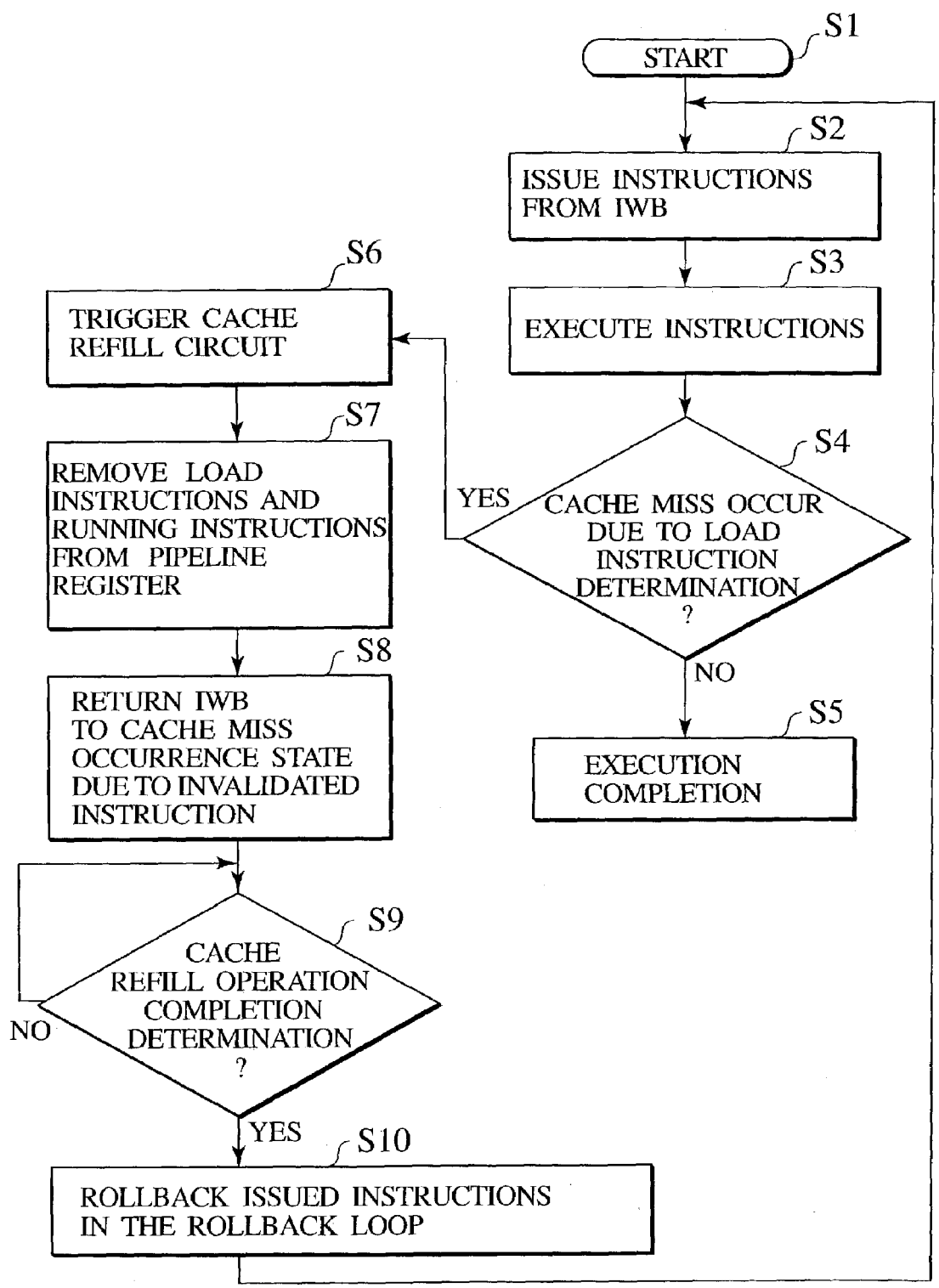
FIG. 2 is a flowchart for explaining the operation of the comparative example of a microprocessor system.

The operation of the comparative example of a microprocessor system is shown in FIG. 2.

(a) Step S1 starts at the state where an instruction COM is given from the instruction fetch unit 1 to the IWB 2.

(b) Next, this process proceeds to step S2, where in turn the IWB 2 issues an instruction INS.

(c) Next, this process proceeds to step S3, where in turn the IWB 3 executes an instruction INS.

(d) Next, this process proceeds to step S4, where in turn the load instruction LCOM is executed and whether or not a cache miss has occurred is determined.

(e) If no cache miss has occurred, the process proceeds to step S5, in which the execution is performed in order.

(f) If cache miss has occurred, the process proceeds to step S6, in which refilling the cache is triggered.

(g) Next, this process proceeds to step S7, where in turn a self-instruction (or a load instruction) and the subsequent instructions being executed are removed from the pipeline.

(h) Next, the process proceeds to step S8, where in turn the IWB is returned to the cache miss state before issue of the invalidated instruction.

(i) Next, the process proceeds to step S9, which determines whether or not refilling the cache has been completed is determined.

(j) If NO, step S9 is repeated.

(k) If YES, the process proceeds to step S10, to determine whether or not the issued instructions are rotated.

(l) Next, the process proceeds to step S2, step S3, and then to step S4. In step S4, a series of operations continue until a cache miss does not occur for the load instruction LCOM.

Since the IWB 2 has a complex issue logic configuration for issuing instructions INS, and the high cost IWB is occupied with the issued instructions INS, the utilization efficiency of the IWB 2 is substantially reduced.

EMBODIMENTS

Next, an embodiment of the present invention is described with reference to drawings. In the drawings to be referenced below, the same or similar reference numerals are attached to the same or similar parts. The embodiment shown below is provided for illustrating an apparatus and method of implementing the technical ideas of the present invention; the technical ideas of this invention, however, do not limit the configuration of components and layout thereof, etc. to what is described below. These technical ideas of the present invention allow a variety of modifications to be made within the scope of the claimed invention.

An 'instruction rollback processor system' according to the present invention denotes a processor system equipped with an instruction rollback function or an instruction rollback device. An 'instruction rollback processor system' denotes a processor system that operates based on an instruction rollback method and an instruction rollback program. 'Instruction rollback' according to the present invention denotes an operation of rotating loop-wise the issued instructions held in the PLGs that are connected in series in a ring shape.

Figure 3:
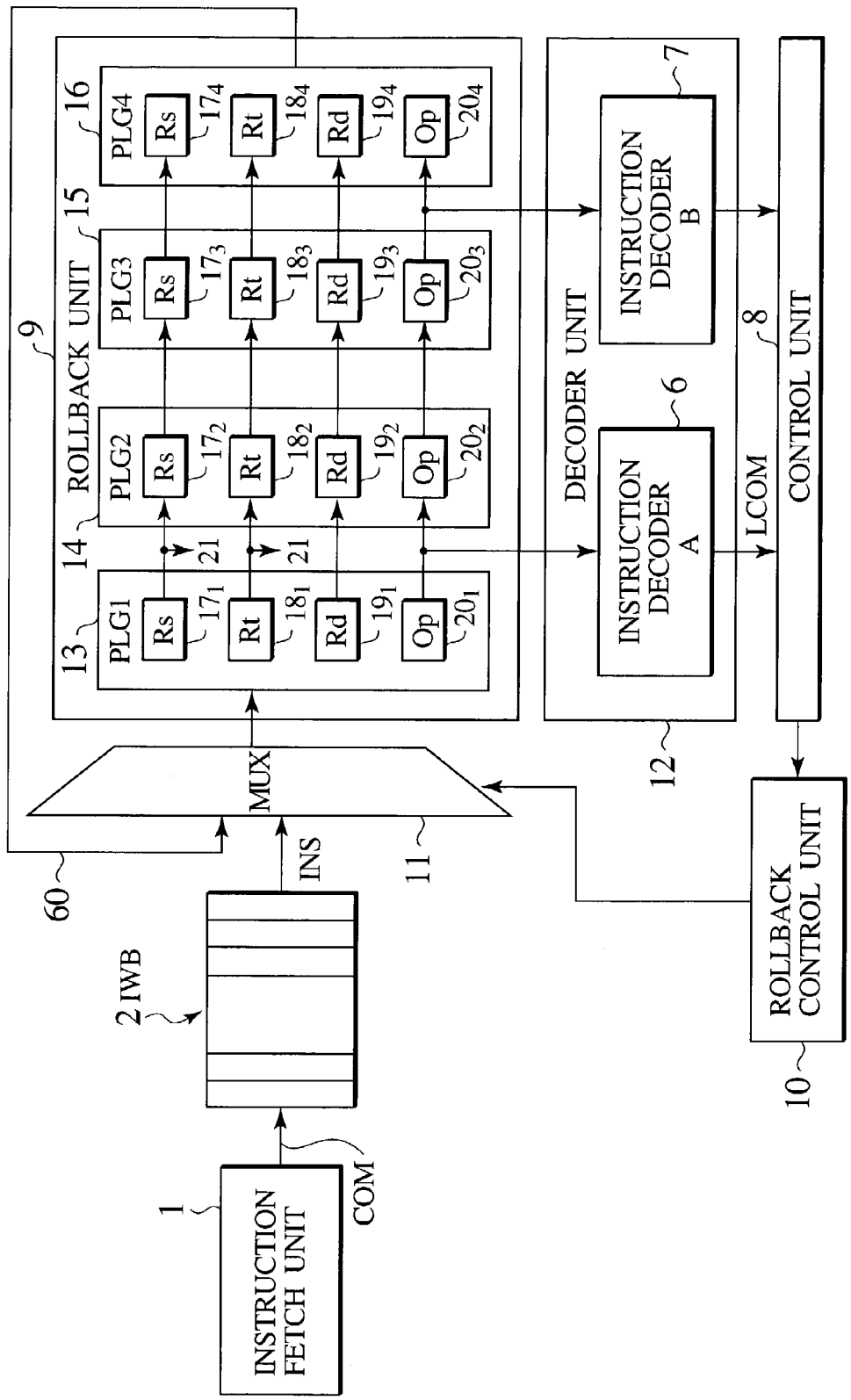
FIG. 3 is a schematic block diagram of an entire instruction rollback processor system according to an embodiment of the present invention.

An instruction rollback processor system according to an embodiment of the present invention, as shown in FIG. 3, includes an instruction window buffer (IWB) 2, which stores multiple instructions aligned in a program counter order, a multiplexer (MUX) 11 having two inputs, in which one input side inputs the output from an instruction window buffer 2, and a rollback unit 9, which is connected between the output side of the MUX 11 and the other input side of the MUX 11. An instruction COM is given from the instruction fetch unit 1 to the IWB 2. The output of the MUX 11 is coupled to the rollback unit 9, which includes the PLGs 13, 14, 15, and 16. The control unit 9 is connected to the decoder unit 12, which includes the first instruction decoder 6 and the second instruction decoder 7. The decoder unit 12 is connected to control unit 8. Between the control unit 8 and the MUX 11, rollback control unit 10 is connected. Included inside the PLGs 13, 14, 15, and 16, data storage units $17_1, 17_2, 17_3,$ and $17_4$, which store the first source register number Rs, data storage units $18_1, 18_2, 18_3,$ and $18_4$, which store the second source register number Rt, data storage units $19_1, 19_2, 19_3,$ and $19_4$, which store the instruction destination numbers Rd, and data storage units $20_1, 20_2, 20_3,$ and $20_4$, which store the instruction operation codes, respectively. Data storage units $17_1, 17_2, 17_3,$ and $17_4$, which store the first source register number Rs, data storage units $18_1, 18_2, 18_3,$ and $18_4$, which store the second source register number Rt, data storage units $19_1, 19_2, 19_3,$ and $19_4$, which store the instruction destination numbers Rd, and data storage units $20_1, 20_2, 20_3,$ and $20_4$, which store the instruction operation codes Op comprise a data storage unit for storing divided pieces of instructions within the PLGs. The operation will be detailed later.

In the PLGs 13 through 16 shown in FIG. 3, data storage units $17_1, 17_2, 17_3,$ and $17_4$, which store the first source register number Rs, data storage units $18_1, 18_2, 18_3,$ and $18_4$, which store the second source register number Rt, data storage units $19_1, 19_2, 19_3,$ and $19_4$, which store the instruction destination numbers Rd, data storage units $20_1, 20_2, 20_3,$ and $20_4$, which store the instruction operation codes of Op, etc. respectively, denote data storage units.

The data storage units $17_1, 17_2, 17_3,$ and $17_4$, which store the first source register number Rs, are a data storage unit that stores instruction source register number Rs.

The data storage units $18_1, 18_2, 18_3,$ and $18_4$, which store the second source register number Rt, are a data storage unit that stores instruction source register number Rt.

The data storage units $19_1, 19_2, 18_3,$ and $19_4$, which store the instruction destination numbers Rd, are a data storage unit that stores instruction destination register numbers Rd.

The data storage units $20_1, 20_2, 20_3,$ and $20_4$, which store the instruction operation codes, are a data storage unit that stores instruction operation codes Op. The instruction operation code Op is decoded so that the instruction format can be determined.

Figure 8:
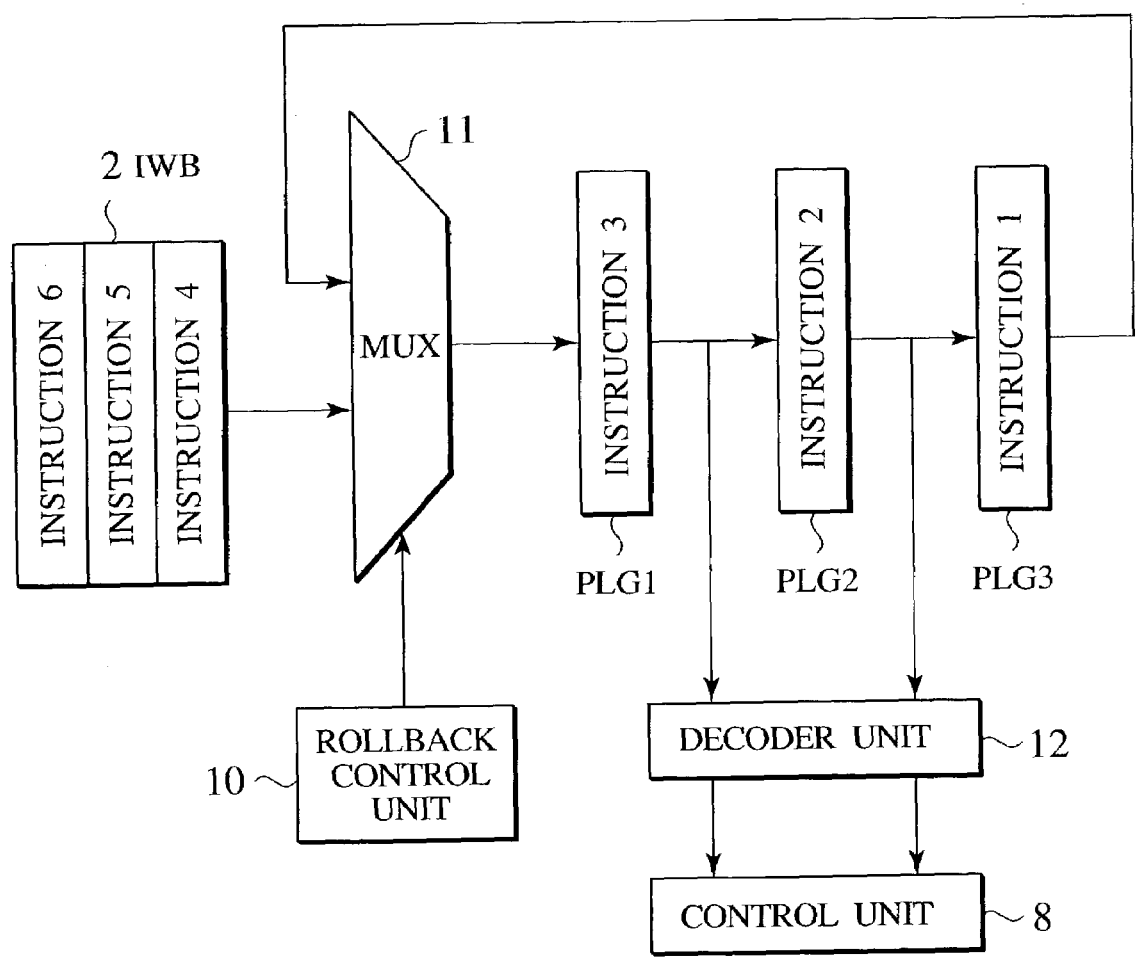
FIG. 8 is a schematic block diagram for explaining the operation of an instruction rollback processor system according to an embodiment of the present invention; in particular, it is a diagram for explaining the state where a data cache miss has occurred.
Figure 10:
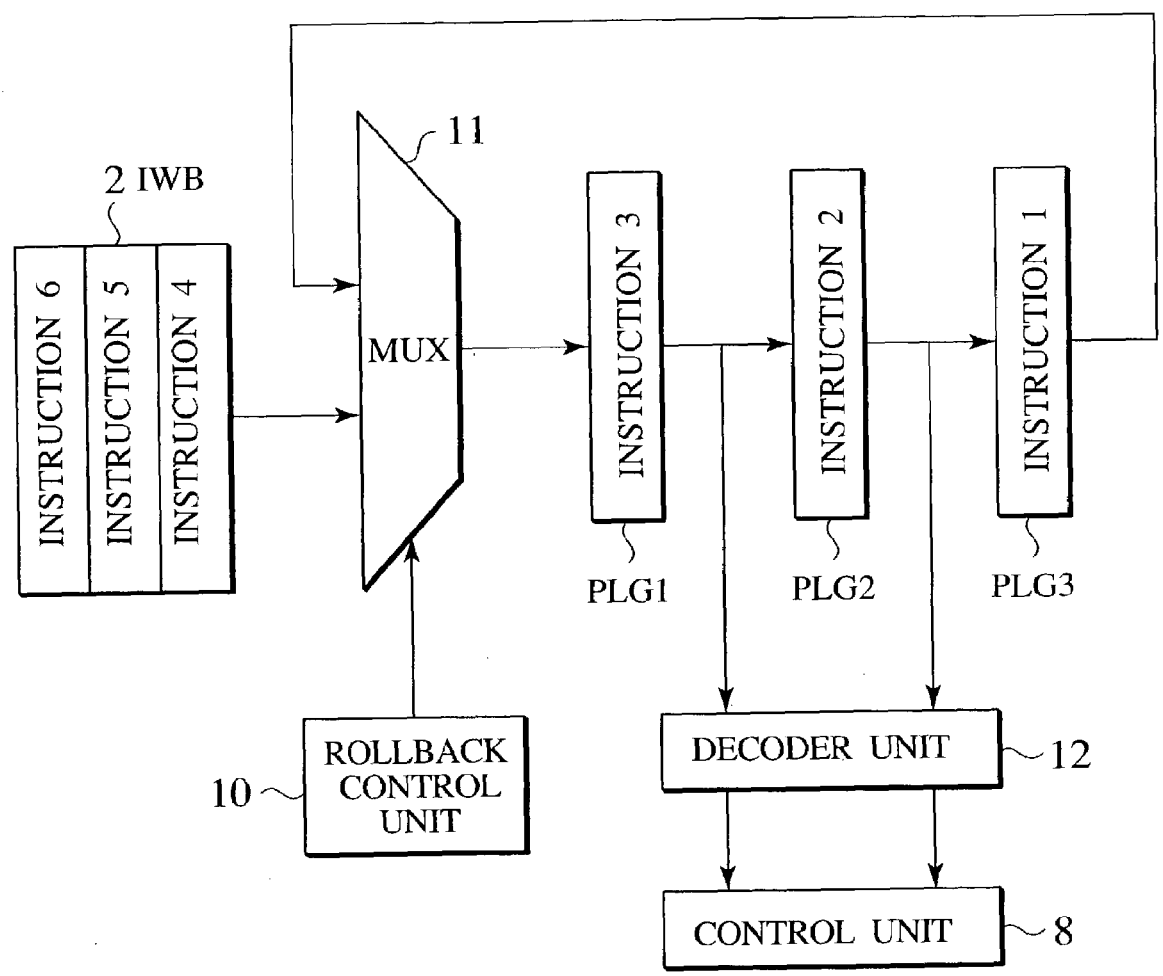
FIG. 10 is a schematic block diagram for explaining the operation of an instruction rollback processor system according to an embodiment of the present invention; in particular it is a diagram for explaining the state where the rollback operation is terminated.
Figure 11:
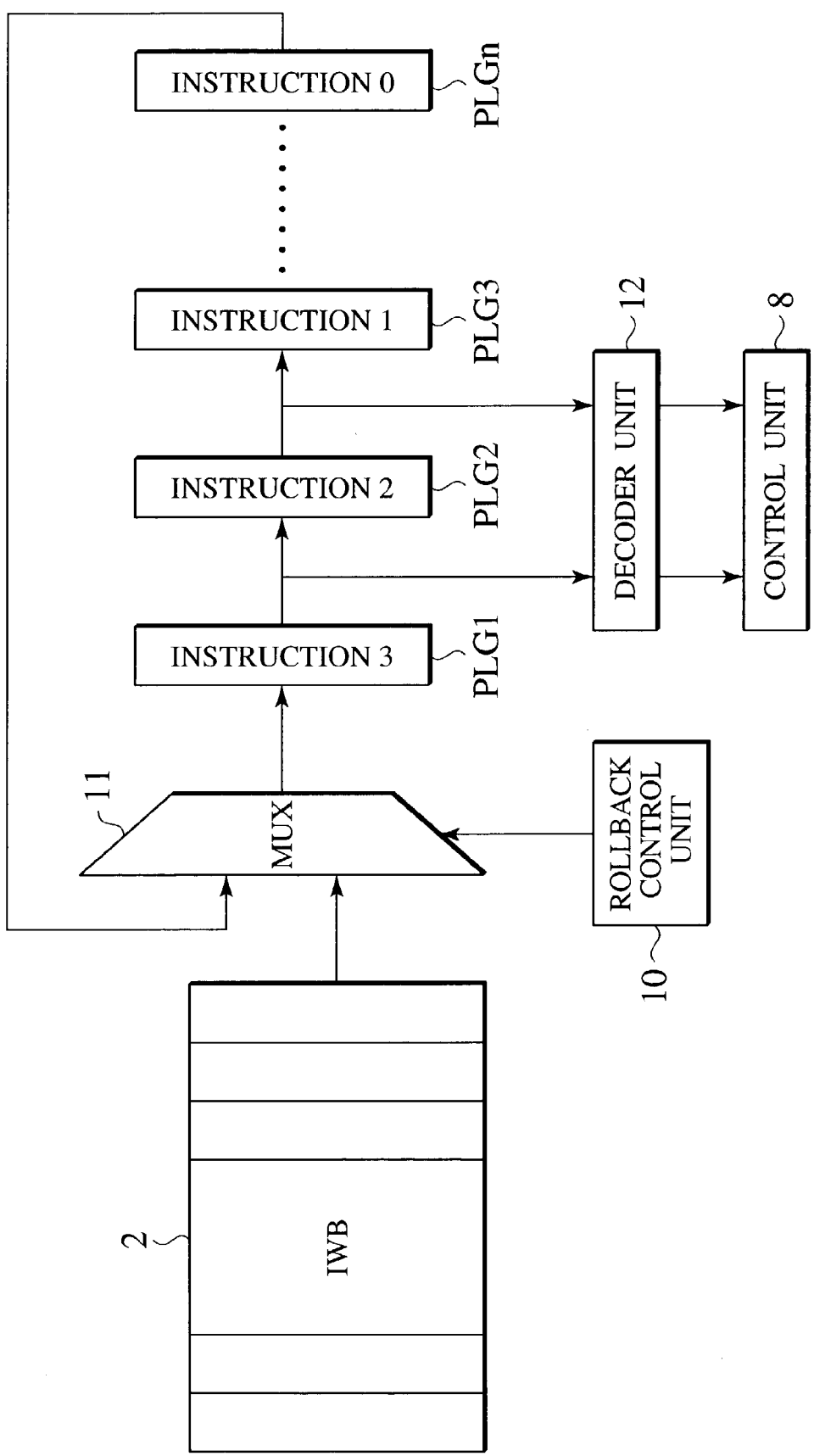
FIG. 11 is a schematic block diagram of an instruction rollback processor system according to an embodiment of the present invention; in particular it is a diagram of an example of n pipeline registers.
Figure 12:
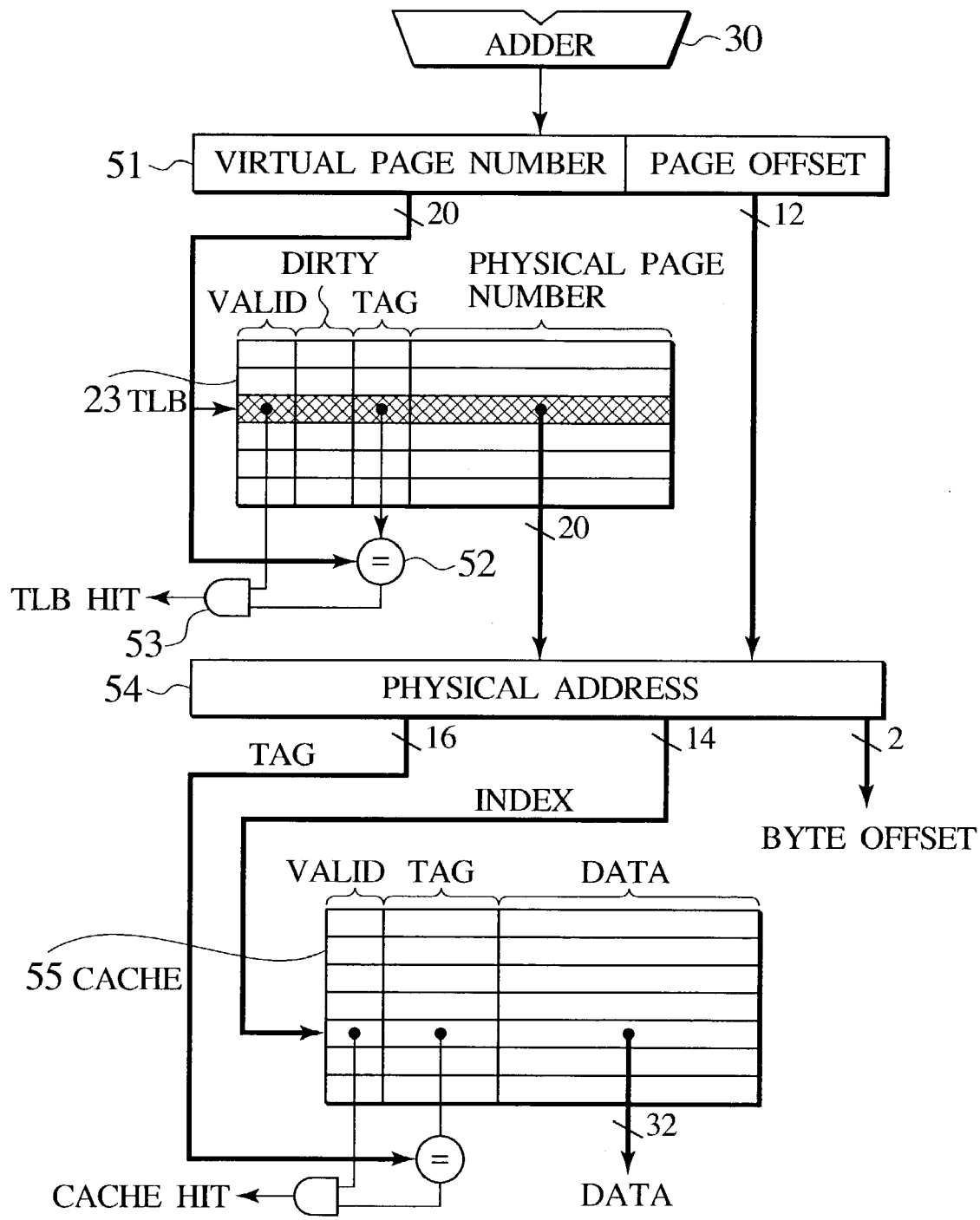
FIG. 12 is a schematic block diagram of a data cache unit configuring cache memory that is used for the instruction rollback processor system according to an embodiment of the present invention.

A difference from the conventional example shown in FIG. 1 is that: the MUX 11 is deployed between the output side 2 of the IWB 2 and the group of PLGs; the rollback control unit 10 controls the multiplexer 11 so as to return the output of the last stage of the PLG 16 to the instruction issue stage side via the rollback lines 60, entering one side of the multiplexer 11; and the output of the IWB 2 is coupled to the other input side of the multiplexer 11. Moreover, a rollback control unit 10 is required in order to control the multiplexer 11. It is noted that while an example of a group of PLGs with a stage of four is shown in FIG. 3, that the number of stage is not limited to four. As shown in FIG. 8 and FIG. 10, a configuration having a stage of three is possible. Or, alternatively, as shown in FIG. 11, a configuration with any number of stage n is possible.

Figure 4:
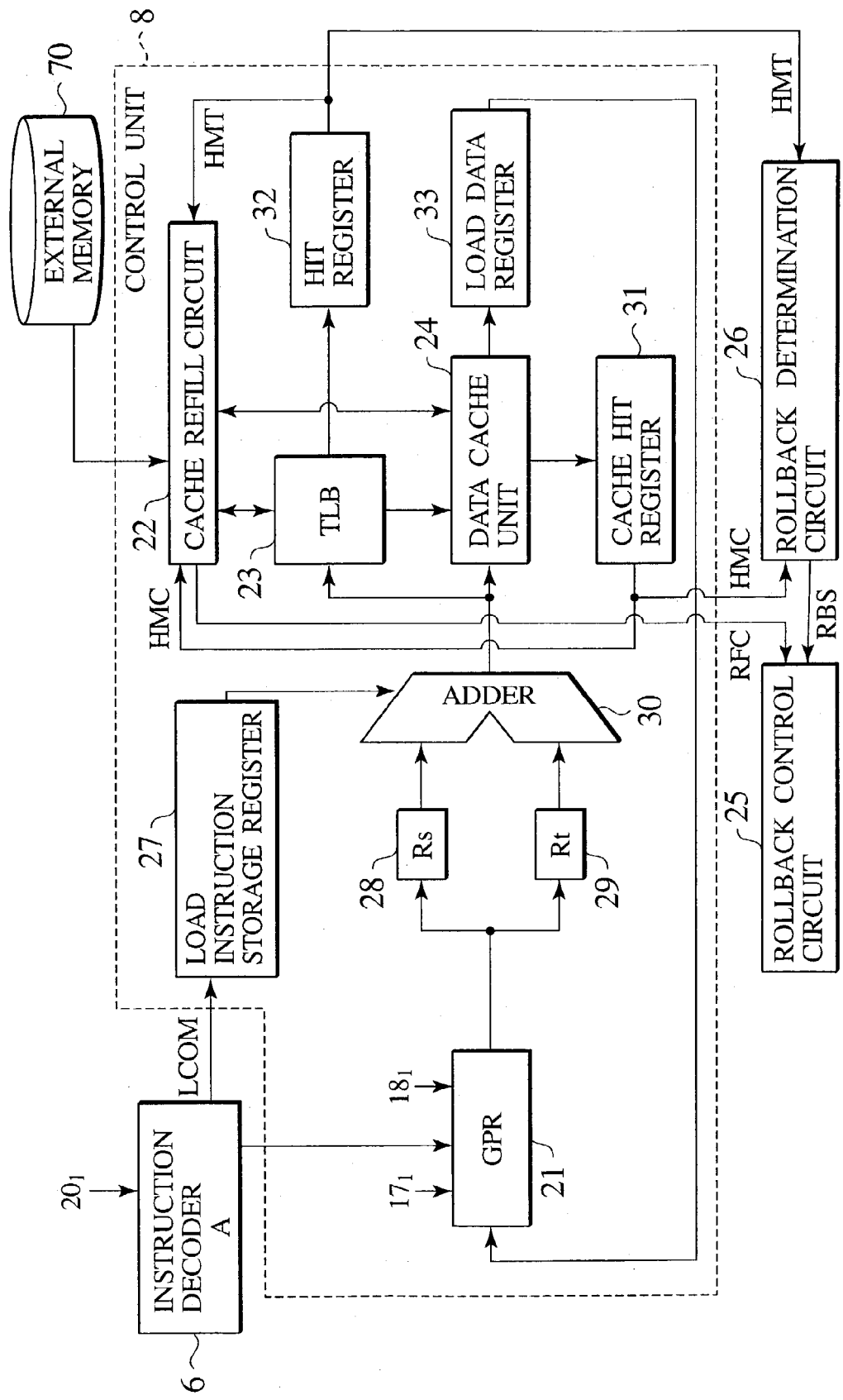
FIG. 4 is a schematic block diagram of a control unit of the instruction rollback processor system according to an embodiment of the present invention.

As shown in FIG. 4, the control unit 8 configuring the instruction rollback processor system shown in FIG. 3 is made up of a general purpose register (GPR) 21 file, a cache refill circuit 22, a TLB (Translation Look-aside Buffer) 23, a data cache unit 24, a load instruction storage register 27, an adder 30, a data cache hit register 31, a TLB hit register 32, and a load data register 33, a data storage unit 28, which stores a first source register instruction value Rs, and a data storage unit 29, which stores a second source register instruction value Rt. The load instruction storage register 27 receives a load instruction LCOM from the first instruction decoder 6 and then transmits the load instruction LCOM to the adder 30. The adder 30 calculates a virtual address for the load instruction storage register 27. In general, the virtual address for memory to be accessed in conformity with load/store instructions is calculated by adding another register content or a fixed value to the source register content. With this configuration, a description adding a fixed value is omitted. Thus, only a path for calculating a virtual address by adding the contents of source registers is described. Accordingly, the adder 30 receives data from the load instruction storage register 27, the data storage unit 28, which stores the first source register instruction value Rs, and the data storage unit 29, which stores the second source register instruction value Rt, adds the values together, and then transmit the resulting value to the data cache unit 24 and the TLB 23. The data cache unit 24 receives data from the TLB 23 and the adder 30 and then receives/transmits data from/to the cache refill circuit 22 while transmitting to the load data register 33 and the cache hit register 31. The load data register 33 receives data from the data cache unit 24 and then transmits it to the GPR 21. The GPR 21 receives pieces of data from the load data register 33, the first instruction decoder 6, the data storage unit $17_1$, which stores the first source register number Rs, the data storage unit $18_1$, which stores the second source register number Rt, and then transmits these instruction values to the data storage unit 28, which stores the first source register instruction value Rs, and the data storage unit 29, which stores the second source register instruction value Rt, in order to read the source operand Rs and Rt, respectively. Data storage units $19_1$, $19_2$, $19_3$, and $19_4$, which store the instruction destination numbers Rd, data storage units $20_1$, $20_2$, $20_3$, and $20_4$, which store the instruction operation codes Op, etc. respectively, denote data storage units. On the other hand, the TLB 23 receives a virtual address from the adder 30, executes data reception/transmission from/to the cache refill circuit 22, and transmits data to the data cache unit 24 and the TLB hit register 32. The TLB hit register 32 receives TLB hit information from the TLB 23 and then transmits data to the cache refill circuit 22, as well as transmits the TLB hit information to the rollback determination circuit 26 in the rollback control unit 10. In the same way, the cache refill circuit 22 receives data from the cache hit register 31 and the TLB hit register 32 and then receives/transmits data from/to the data cache unit 24 while transmitting data to the rollback control circuit 25 in the rollback control unit 10. Moreover, as shown in FIG. 4, reception/transmission of data between the data cache unit 24 and the cache refill circuit 22 is performed.

While two instruction decoders or the first instruction decoder 6 and the second instruction decoder 7 are shown in the decoder unit 12 of FIG. 3, the first instruction decoder 6 can alternatively function alone. That is, for example, as shown in FIG. 4, control for any instruction including load instructions LCOM is performed such that instructions are decoded by the first instruction decoder 6, and the decoded information is then held in the control unit 8 and given to the GPR 21, the TLB 23, the adder 30 or the like.

Figure 5:
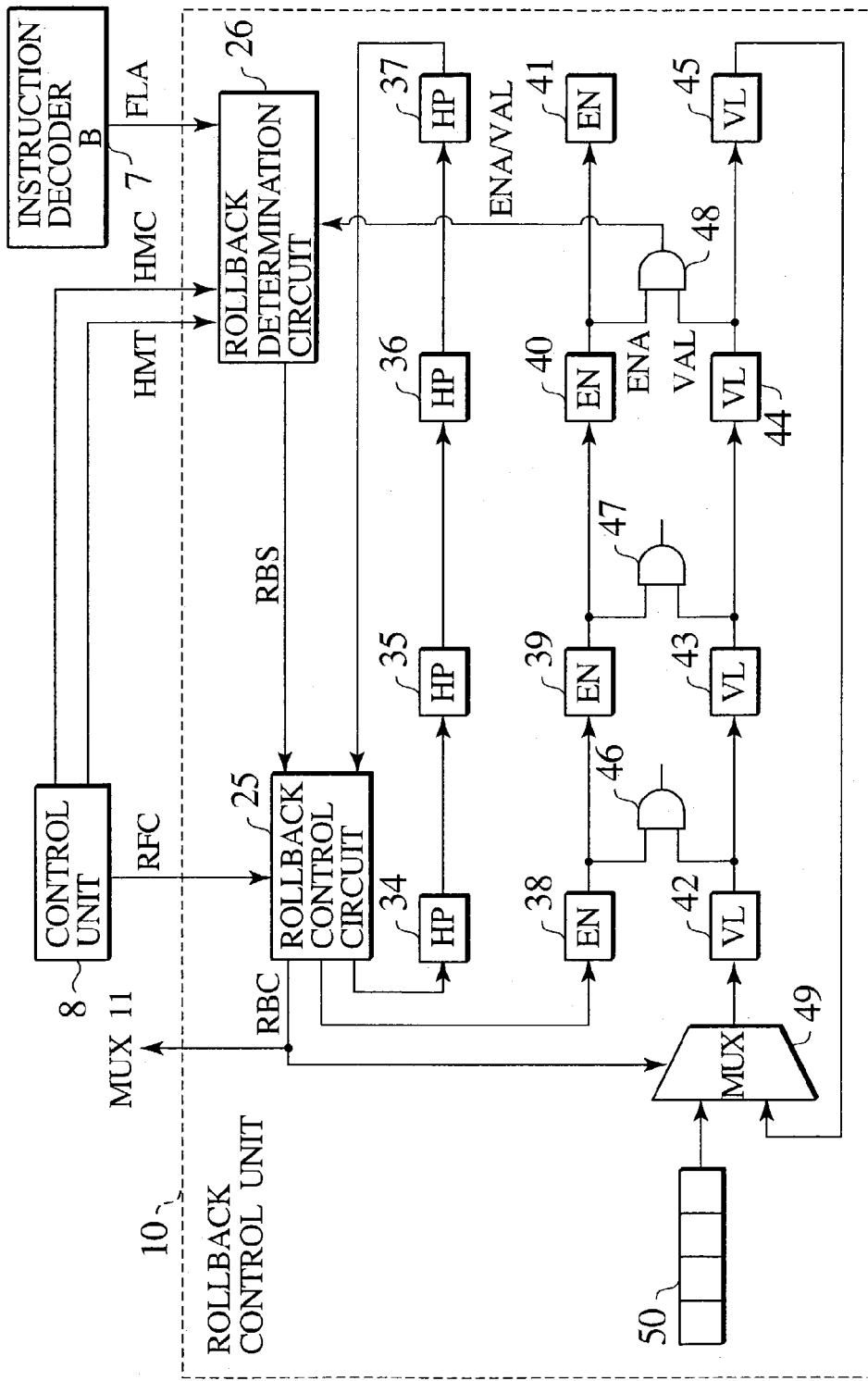
FIG. 5 is a schematic block diagram of a rollback control unit of the instruction rollback processor system according to an embodiment of the present invention.

As shown in FIG. 5, the rollback control unit 10 configuring the instruction rollback processor system shown in FIG. 3 is made up of a rollback control circuit 25, a rollback determination circuit 26, head pointer (HP) PLGs 34, 35, 36, and 37, enable signal (EN) PLGs 38, 39, 40, and 41, valid signal (VL) PLGs 42, 43, 44, and 45, AND gate circuits 46, 47, and 48, a MUX 49, and a valid buffer (Valid Buffer) 50.

The rollback control circuit 25 receives a refill completion signal RFC from the cache refill circuit 22 in the control unit 8, a rollback start signal RBS from the rollback determination circuit 26, and a signal from a head pointer (HP) PLG 37. In addition, the rollback control circuit 25 transmits signals to the head pointer (HP) PLG 34 and the enable signal (EN) PLG 38, respectively, and a rollback control signal RBC to the MUXs 11 and 49. On the other hand, the rollback determination circuit 26 receives a hit miss signal HMT stored in the TLB hit register 32 in the control unit 8 and a cache miss signal HMC stored in the cache hit register 31. The rollback determination circuit 26 also receives a flag signal FLA from the instruction decoder 7. In the rollback control unit 10, the rollback determination circuit 26 also receives an output signal from the AND gate 48, and then transmits a rollback start signal RBS to the rollback control circuit 25. The MUX 49 receives signals from the valid buffer 50 and the valid signal (VL) PLG 45, and then transmits data to the valid signal (VL) PLG 42. It is noted that shifting data from the valid signal (VL) PLG 42 to the valid signal (VL) PLGs 43, 44, and 45 corresponds to shifting data from the head pointer (HP) PLG 34 to the head pointer (HP) PLGs 35, 36, and 37, and also corresponds to shifting data from the enable signal (EN) PLG 38 to the enable signal (EN) PLGs 39, 40, and 41. Moreover, the timing for such data shifting corresponds to that for shifting data from the PLG 13 to the PLGs 14, 15, and 16. Shifting data between the PLGs 13 and 14 corresponds to shifting data between the valid signal (VL) PLGs 42 and 43; shifting data between the PLGs 14 and 15 corresponds to shifting data between the valid signal (VL) PLGs 43 and 44; and shifting data between the valid signal (VL) PLGs 44 and 45 corresponds to shifting data between the PLGs 15 and 16. These stages are defined as an 'ID stage', an 'EX stage', and a 'WB stage', respectively. Moreover, the stage from the valid buffer 50 via the MUX 49 to the PLG 42 corresponds to the stage from the IWB 2 via the MUX 11 to the PLG 13 and is defined as an 'IS stage'. Moreover, the stage until data is input to the IWB 2 from the instruction fetch unit 1 is defined as an 'IF stage'.

Referring to FIG. 3 through FIG. 5, the rollback control operation in the instruction rollback processor system according to an embodiment of the present invention is described. To begin with, a definition of terms is given. In the following definition, a flag (FLA) signal, a valid (VAL) signal, and a hit signal, a decoder output are all on a positive logic basis; where '0' denotes 'invalid' while '1' denotes 'valid'. Moreover, 'assert' denotes a signal being in a 'valid' state or outputting '1' while 'negate' denotes a signal being in a 'invalid' state or outputting '0'. A valid signal VAL or the like is configured loop-wise and exists in each stage. In order to distinguish between each stage, the expression of an 'ID stage valid signal', an 'EX stage valid signal', and a 'WB stage valid signal' is used.

A 'valid signal (VAL)' exists in each stage; and when a valid instruction exists within a stage, that signal becomes '1'. Irrelevant of whether it is within the rollback time period, that signal is '1' when an instruction exists. An 'enable signal (ENA)' exists in each PLG stage, and designates whether an instruction existing in a stage should be executed. In a stage where the 'enable signal' is '1' and the 'valid signal' is '1', an instruction is executed. The 'head pointer (HP) signal' is '0' for all the stages during normal operation. During rollback operation, it is set to '1' only for the first instruction that requires a rollback operation. On the other hand, the 'head pointer (HP) signal' is set to '0' for instructions not existing at the top position.

In the 'IF stage', an instruction is read out from the instruction fetch unit (instruction cache) 1 and then written in the IWB 2. When an instruction has been written, a '1' is written in the valid buffer 50 for the valid signal VAL. The valid buffer 50 accommodates entries that correspond to each entry respectively in the IWB 2; wherein '1' is written in the valid buffer 50 when a valid instruction is stored in the IWB 2, and '0' is written therein when a valid instruction signal is not stored.

In the 'IS stage', instructions where the corresponding slot in the valid buffer 50 is '1' are issued in a chronological order. An instruction hazard that exists in the IWB 2 is detected, and whether or not issuing an instruction is possible is then determined. If it is possible to issue an instruction, that instruction is executed. During rollback operation, a PLG instruction rolled back that does not come from the instruction buffer is issued.

In the 'ID stage', an instruction is decoded. The GPR 21 reads the source register value and data bypass is performed.

In the 'EX stage', an instruction is executed. In the case of a load instruction, a memory address is calculated from the source register value. With this address calculated, the TLB 23 is accessed to convert a virtual address to a physical address. If a TLB 23 hit occurs, a correct physical address is obtained. Otherwise, if a TLB 23 hit does not occur, a correct physical address cannot be obtained. Whether or not a hit or a miss occurs is determined based on a TLB hit signal output from the TLB 23. The TLB hit signal is stored in a TLB hit register 32.

A data cache unit 24 is accessed with a converted physical address. When a hit occurs on the data cache unit 24, the data cache unit 24 asserts a hit signal. A hit signal is stored in the cache hit register 31. When a hit occurs, the data cache outputs data. The data is stored with a load data register 33. An arithmetic instruction such as an addition instruction is executed in this stage.

In a 'WB stage', when the valid signal VAL is '1', and the enable signal ENA is '1', a calculated result or loaded data is written in the GPR 21 (Write Back.) When both the TLB hit register 32 value and the cache hit register 31 value are '1' or when a hit occurs on the TLB 23 and a cache hit occurs, since data can be normally loaded, the PLG (load data register) 33 value is written in the GPR 21.

When a miss occurs, or either the TLB hit register 32 value or the cache hit register 31 value is '0', loading cannot be normally performed, and thus a rollback operation is executed. An instruction decoder 7 decodes an instruction code stored in the data storage unit 20, and then outputs a flag FLA indicating whether an instruction under execution is a load instruction. A rollback determination circuit 26 inputs this flag FLA, a signal stored in the TLB register 32, a signal stored in the cache hit register 31, an enable signal ENA, and a valid signal VAL, and operates as described below. That is, when the TLB hit register content is '1', the cache hit register content is '0', the enable signal is '1', and the valid signal is '1', a rollback start signal RBS is asserted.

At this time, the cache refill circuit 22 starts cache refill operation. That is, reading of data from an external memory 70 is initiated, and the read data is written in the data cache unit 24 or the TLB 23. After writing in the data cache unit 24 or the TLB 23 has been completed, a refill completion signal RFC is asserted.

The valid signal VAL and the head pointer signal HP are connected ring-wise between each stage. As an instruction shifts between each pipeline stage, each result thereof is propagated to the next stage in turn.

(Rollback Operation)

Figure 6:
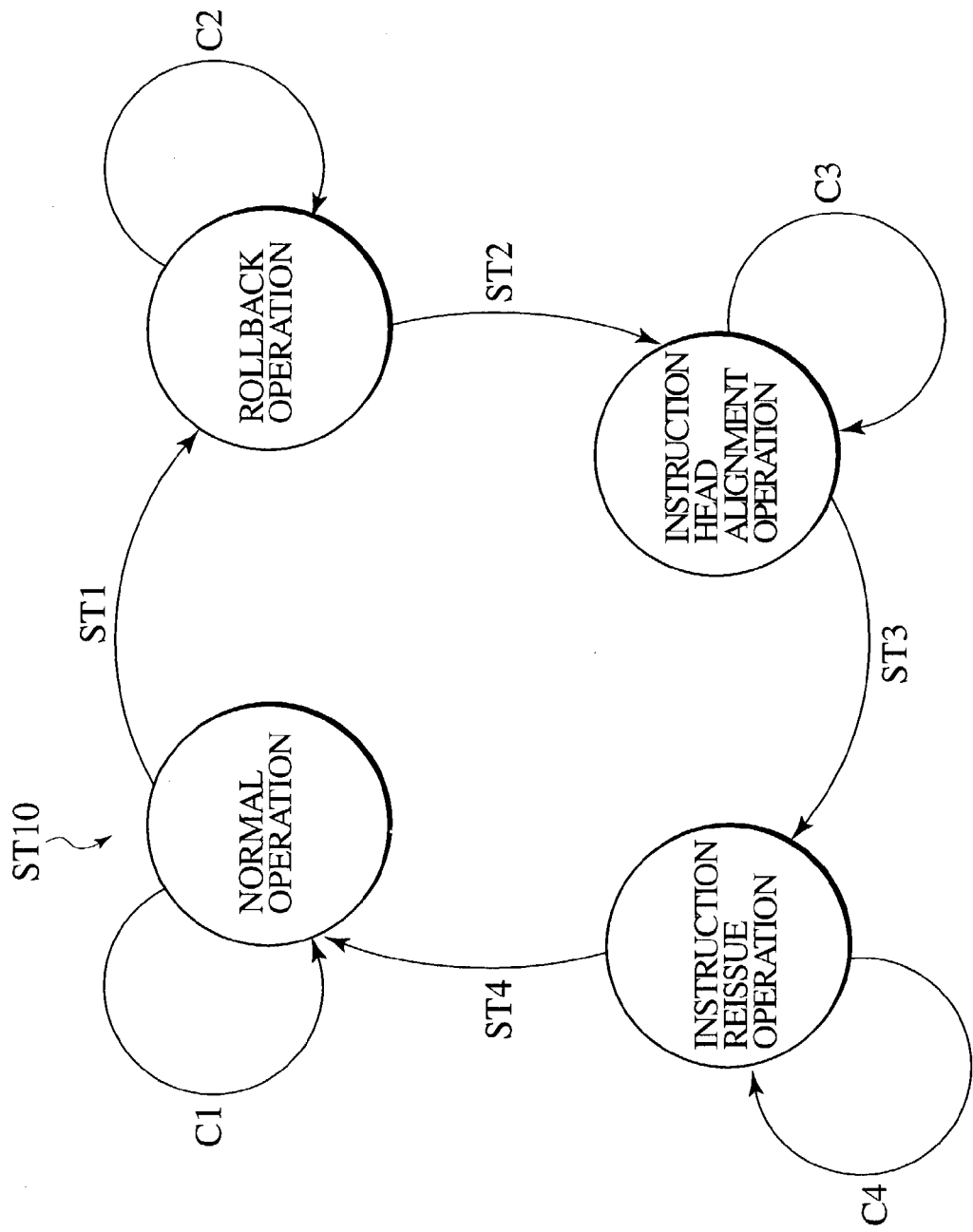
FIG. 6 is an internal transition state diagram for explaining the rollback operation of an instruction rollback processor system according to an embodiment of the present invention.

As shown in FIG. 6, a rollback processor system according to an embodiment of the present invention executes a rollback operation by conducting an internal transition state. In FIG. 6, ST0, ST1, ST2, ST3, and ST4 denote transition states, respectively. 'NORMAL OPERATION', 'ROLLBACK OPERATION', 'INSTRUCTION HEAD ALIGNMENT OPERATION', and 'INSTRUCTION REISSUE OPERATION' represent the respective operating states while C1, C2, C3, and C4 represent the transition states of the respective internal operating states. ST0 denotes initialization and represents the transition state from the initial state to the 'NORMAL OPERATION' state. ST1 represents a transition state from the 'NORMAL OPERATION' to the 'ROLLBACK OPERATION', which emanates from the fact that a rollback start signal RBS is asserted and the 'head pointer' becomes '1'.

ST2 represents a transition state from the 'ROLLBACK OPERATION' to the 'INSTRUCTION HEAD ALIGNMENT OPERATION', which emanates from a refill completion signal RFC being asserted. ST3 represents a transition state from the 'INSTRUCTION HEAD ALIGNMENT OPERATION' to the 'INSTRUCTION REISSUE OPERATION'. ST4 represents a transition state from the 'INSTRUCTION REISSUE OPERATION' to the 'NORMAL OPERATION', which emanates from the head pointer becoming '0'. C1 denotes the internal transition state on the 'NORMAL OPERATION', C2 denotes internal transition state on the 'ROLLBACK OPERATION', C3 denotes internal transition state on the 'INSTRUCTION HEAD ALIGNMENT OPERATION', and C4 denotes the internal transition state on the 'INSTRUCTION REISSUE OPERATION'.

The rollback operation is described below.

(1) In the 'WB stage', when a rollback start signal RBS is asserted, the rollback control circuit 25 starts operation.
 (i) The rollback control circuit 25, when the rollback start signal RBS is '1', shifts the current internal state to the 'ROLLBACK OPERATION' state.
 (ii) The rollback control circuit 25 outputs '1' as a signal that is to be stored in the PLG 34 for ahead pointer in the IS stage. Accordingly, the head pointer (HP) signal corresponding to the rollback head instruction is then set to '1'. It should be noted that from the next cycle, a value will be received from the loop side (WB stage) and that value will be passed through intact and then output.
 (iii) The MUXs 11 and 49, which are coupled to the outputs of the respective IWB 2 and valid buffer 50, are controlled so as to select the output to the loop side. The two MUXs 11 and 49 input signals from the IS stage and the loop side (WB stage). During non-ROLLBACK OPERATION (NORMAL OPERATION), the MUXs 11 and 49 operate to select the output to the IS stage side. During the ROLLBACK OPERATION, the MUXs 11 and 49 operate to select the loop side so that instructions and valid signals are shifted loop-wise.
 (iv) '0' is output as an enable signal for the IS stage. Accordingly, the enable signal for each stage becomes '0' in turn.

Once the rollback operation starts, instructions are shifted loop-wise while maintaining the above-described state.

(2) The cache refill circuit 22 reads data out from the external memory 70 and then completes refilling the data cache unit 24 and the TLB 23. The rollback control circuit 25 performs the next operation when the refill completion signal RFC is asserted.
 (i) The current internal state shifts to the 'INSTRUCTION HEAD ALIGNMENT OPERATION' state.
 (ii) The head pointer (HP) PLGs 34, 35, 36, and 37 pass through the WB stage value intact and then output the WB stage value.
 (iii) '0' is continuously output as an enable signal for the IS stage so that the operation of each stage is halted.
 (iv) A control operation is performed to select the loop side of the MUXs 11 and 49.
 (V) The head pointer (HP) signal on the WB stage (the loop side) is monitored, and the current state is maintained until it becomes '1'.

(3) Once the head pointer (HP) signal on the WB stage (the loop side) becomes '1', the next operation is then executed.
 (i) The current internal state shifts to 'INSTRUCTION REISSUE OPERATION' state.
 (ii) The head pointer (HP) PLGs 34, 35, 36, and 37 pass through the WB stage value intact and then output the WB stage value.
 (iii) '1' is output as an enable signal for the IS stage so that the operation of that stage is executed.

(iv) A control operation selects the loop side of the MUXs 11 and 49. Re-execution continues until an instruction to be re-executed loops back to make a single loop and the data stored in the head pointer (HP) PLGs 34, 35, 36, and 37 become '1' again.

(4) When the head pointer (HP) of the WB stage becoming '1' again, the next operation is then executed returning to the normal mode.

(i) The current internal state shifts to the 'NORMAL OPERATION' state.

(ii) '0' is output as a head pointer (HP).

(iii) '1' is output as an enable signal for the IS stage.

(iv) A control operation selects the stage side or the IWB 2 side of the MUXs 11 and 49.

Figure 7:
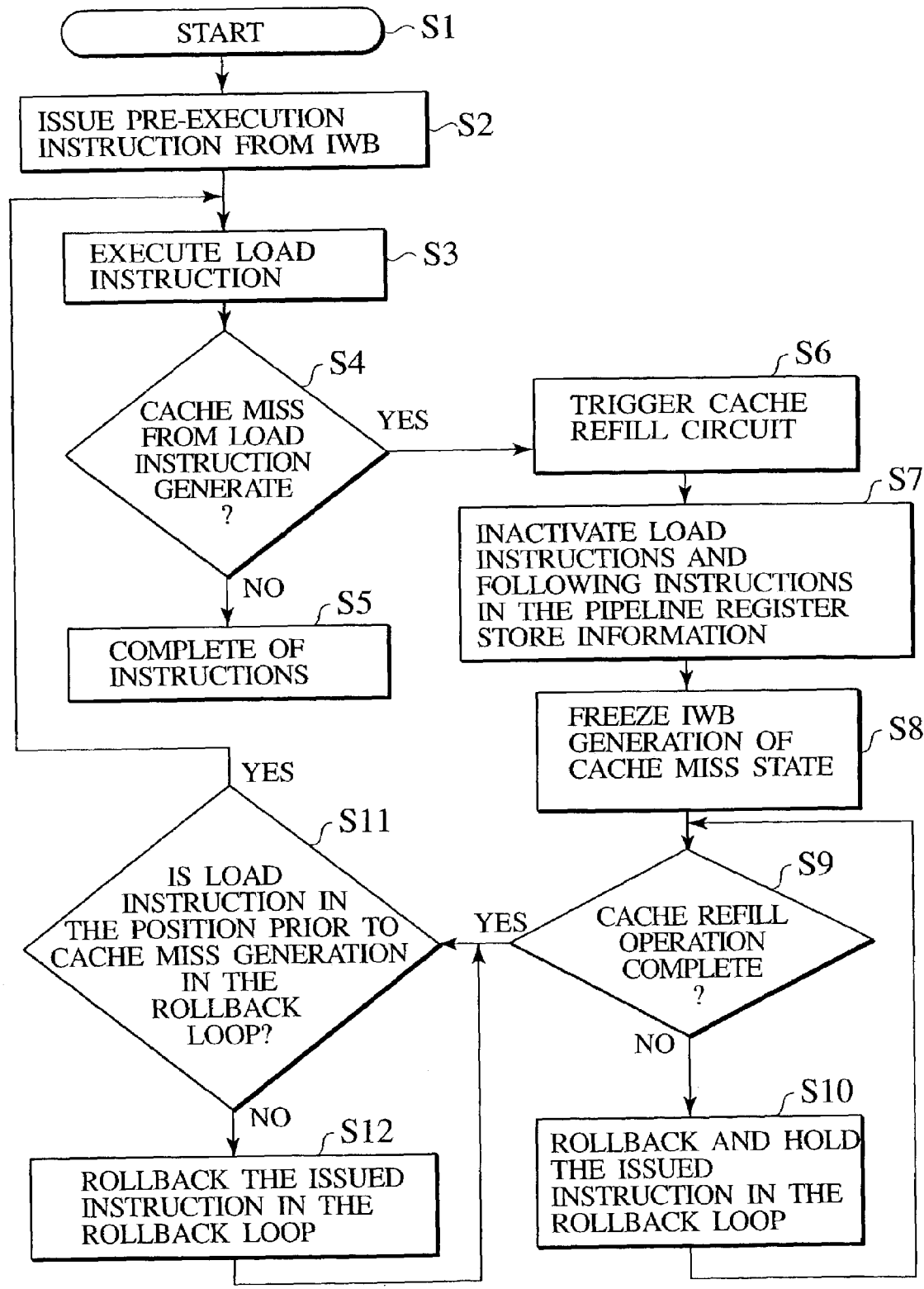
FIG. 7 is a flowchart for explaining the operation of an instruction rollback processor system according to an embodiment of the present invention.

A flowchart for explaining the operation of a rollback processor system according to an embodiment of the present invention is represented by steps S1 through S12 shown in FIG. 7.

(a) Step S1 starts at the state where an instruction COM is given from the instruction fetch unit 1 to the IWB 2.

(b) Next, in step S2, the IWB 2 issues an instruction that is not yet executed.

(c) Next, in step S3, the instruction that is not yet executed is executed.

(d) Next, in step S4, if the instruction that is not executed is a load instruction LCOM, a determination is made as to whether a cache miss has occurred.

(e) If a cache miss does not occur due to the load instruction LCOM, the process proceeds to step S5, in which that instruction is then completed.

(f) If a cache miss occurs due to the load instruction LCOM, the process proceeds to step S6, in which the cache refill circuit 22 is triggered by a trigger signal (cache miss signal) HMC.

(g) Next, the process proceeds to step S7, in which a load instruction and subsequent instructions within the pipeline registers are then made inactive (data is held).

(h) Next, the process proceeds to step S8, the IWB 2 is frozen to the state of when the cache miss occurred.

(i) Next, the process proceeds to step S9, to determine whether to complete the operation of the cache refill circuit 22.

(j) Next, if the cache refill circuit 22 cannot be terminated, the process proceeds to step S10, in which an issued instruction is being rotated and held.

(k) Next, the process returns to step S9, to repeat determination of whether to complete the operation of the cache refill circuit 22.

(l) If the operation of the cache refill circuit 22 can be terminated, the process proceeds to step S11, in which a determination is made as to whether a rotating load instruction within the loop is positioned just before a cache miss occurs.

(m) In step S11, if the rotating instruction within the loop is positioned just before a cache miss occurred, the process returns to S3, in which the instruction INS is then executed.

(n) In step S11, if the rotating instruction within the loop is not positioned just before a cache miss occurred, the process proceeds to S12, in which the issued instruction is then rotated.

(o) Next, the process returns to step S11, in which a determination is made as to whether the rotating issued instruction within the loop is positioned just before a cache miss occurs.

(p) In step S11, if the rotating instruction within the loop is positioned just before a cache miss occurred, the process returns to S3, in which the instruction INS is then executed, and in step S4, if a cache miss does not occur due to the load instruction LCOM, the process proceeds to step S5, in which that operation for instruction is completed.

Conventionally, in sync with the time for pipeline-executing an instruction, so many kinds of instructions, using resources, and operand control data or the like are staged among the PLGs and is retained in the PLGs. An instruction rollback processor system according to the present invention is characterized in that based on the fact that the held data is necessary and sufficient information for re-executing an instruction, the instruction is utilized again by returning the instruction to the multiplexer 11, which configures an instruction issue unit as re-execution is required. Accordingly, the control unit 8 stores a data cache unit 24 miss signal in the cache hit register 31 and stores a TLB 23 miss signal in the TLB hit register 32 while the rollback control unit 10 inputs these trigger signals, which trigger a rollback operation, samples these trigger signals in sync with execution of an instruction, and determines whether a rollback operation is required. These trigger signals herein correspond to a miss signal HMC, which is stored in the cache hit register, and a hit/miss signal HMT, which is stored in the TLB hit register, respectively. The miss signal HMC that is stored in the cache hit register 31 enters the cache refill circuit 22 and the rollback determination circuit 26. The miss signal HMC that is stored in the TLB hit register 32 is entered in the cache refill circuit 22 and the rollback determination circuit 26.

Figure 9:
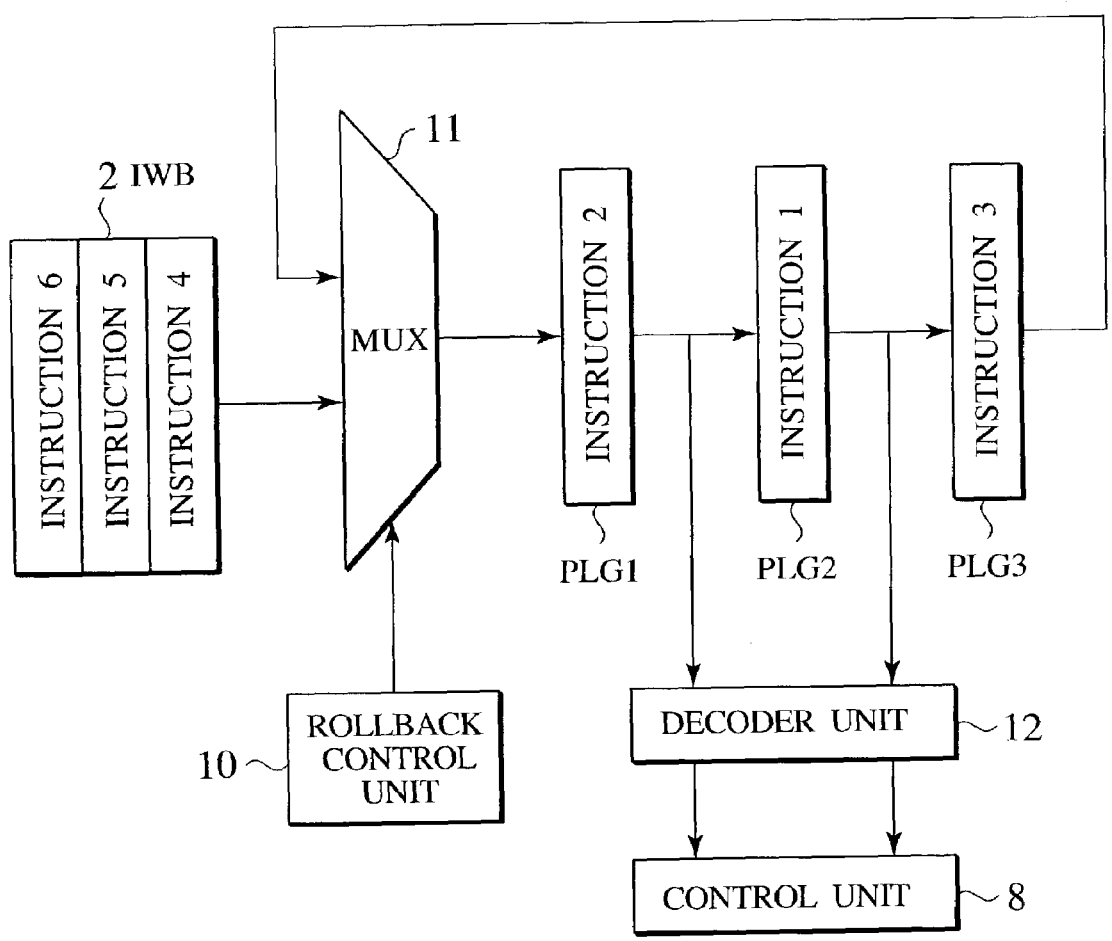
FIG. 9 is a schematic diagram for explaining the operation of an instruction rollback processor system according to an embodiment of the present invention; in particular it is a diagram for explaining the rollback operation.

Next, referring to FIGS. 8 through 10, the operation of an instruction rollback processor system according to the present invention is described. FIG. 8 shows a data cache miss generation state, FIG. 9 shows a rollback operation state, and FIG. 10 shows a rollback completion state. The configuration of the instruction rollback processor system shown in FIGS. 8 through 10 corresponds to the case of three stages of PLGs, as shown in FIG. 3. The decoder unit 12 and the control unit 8 shown in FIGS. 8 through 10 are the same configuration as described above. Instructions shown in FIGS. 8 through 10 and FIG. 11, which is described later, are pipeline-processed by the decoder unit 12 and the control unit 8.

In the data cache miss generation state, as shown in FIG. 8, the IWB 2 accommodates an 'instruction 4', an 'instruction 5', and an 'instruction 6' in the written order, and three stages of PLGs 1, 2 and 3, which are deployed after the MUX 11, accommodate an 'instruction 1', an 'instruction 2', and an 'instruction 3', respectively. The output of the IWB 2 is input to the MUX 11. The output of the PLG 3 is input to the input side of the MUX 11 loop-wise. A rollback control unit 10 is connected to the MUX 11. It is assumed here that the 'instruction 1', the 'instruction 2', and the 'instruction 3' are a load instruction and subsequent instructions, respectively. FIG. 8 shows the moment of starting a rollback operation after a data cache miss occurs due to the 'instruction 1' on the PLG 3. Thereafter, the MUX 11 shifts to the 'instruction 1' selection mode.

In the case where a rollback operation is required, as shown in FIGS. 9 and 10, when that instruction reaches the last stage of the PLG 3, the 'instruction 1' located at the top for the rollback operation reaches the last stage of the PLG 3. At this time, the rollback control unit 10 sets a control signal to make the MUX 11 select the output to the output side of the last stage of the PLG 3. Therefore, the 'instruction 1', the 'instruction 2', and the 'instruction 3' stored in the PLGs 1, 2, and 3 pass through the MUX 11 returning again to the pipeline registers configured with a group of PLGs and then are stored again in the PLGs. The first instruction to be rolled back and instructions existing in the PLGs at this time (the 'instruction 1'through the 'instruction 3') are rolled back in turn so as to make a loop (FIG. 9.) When the cache refill circuit 22 has notified the rollback control circuit 25 of cache refill completion, rolling back of the 'instruction 1' continues until it returns to the position of the PLG3 again.

When it is determined that the rolled back 'instruction 1' reaches the last stage of the PLG 3 again and the rollback operation was normally completed, the MUX 11 is controlled to select the 'instruction 4', which is an additional instruction from the IWB 2 side, as shown in FIG. 10, and afterwards, subsequent instructions are issued regularly.

At this time, if recovery from the cache miss state has not yet been made, and a re-rollback operation is required, further rollback operations can continue by controlling the control signal so that the MUX 11 will continue to select the PLG side. The 'instruction 1' through the 'instruction 3' are executed repeatedly until the rollback operation succeeds.

In FIGS. 8 through 10, it is assumed that the PLGs 1 through 3 are all filled up with instructions. However, there may be a case where each instruction cannot be issued at each cycle due to a pipeline hazard or the like. In this case, some of the PLGs 1 through 3 become 'bubble (empty)'. This 'bubble' is necessary for a timing control to clean a pipeline hazard. Therefore, since even during a rollback operation, quite similar hazards may occur (however, there is also the case where some of hazards are different), a 'bubble' is required as with the condition of 'NORMAL OPERATION'. In the case where the instruction rollback processor system according to the present invention uses an instruction rollback method, since the 'bubble' has been already inserted, an additional control for solving a hazard is not required. Due to this, just simply re-issuing of instructions stored in the PLGs in turn allows easy implementation of a rollback operation.

The number of stages of the PLGs connected to the MUX 11 is not limited to three. In the case of n stages (where n is a natural number), the configuration shown in FIG. 11 is provided, and instructions are shifted among PLG 1, PLG 2, PLG 3, . . . , PLG n in the written order. The output of the last stage of the PLG n is returned to the MUX 11. Control by the rollback control unit 10 allows a selection of either a rollback operation or an instruction re-issue operation, which issues an additional instruction from the IWB 2. Since parallel processing speed goes up as the number of stage n of the PLGs increases, CPU processing performance goes up. Moreover, since each PLG accommodates an instruction for a fixed period of time, when the number of stage n of the PLGs increases so as to increase the depth of entries, restarting of the pipeline takes time. Accordingly, the instruction execution speed decreases. Therefore, a stage of sixteen, thirty-two or the like, for example, is chosen for implementation.

The data cache unit 24 configuring cache memory, which is used for the instruction rollback processor system according an embodiment of the present invention, is made up of a virtual address storage unit 51, which is connected to an adder 30, a TLB 23, a physical address storage unit 54, and a cache memory unit 55. The output of the adder 30 is coupled to the virtual address storage unit 51, and the output thereof is input to the TLB 23. The TLB 23 converts a virtual address, which is stored in the virtual address storage unit 51, to a physical address in a manner described below. The TLB 23 has multiple entries, each including a valid, a dirty, a tag, and a physical page number field. Using as a key a virtual page number in the virtual address storage unit 51, the TLB 23 retrieves and take out one of the multiple entries in the TLB 23. The match comparator 52 compares the tag (TAG) field value of the retrieved entry and the virtual page number in the virtual address storage unit 51. If a match occurs therebetween, the match comparator 52 outputs '1'. If the valid flag in that entry is '1' (valid), the output of the AND gate 53 becomes '1'. This means that a TLB 23 hit has occurred and a required entry has been found in the TLB 23. If there is no match, a TLB HIT for the TLB 23 becomes '0'. Since this means that the required entry was not found in the TLB 23, the required entry is read out from the memory and then written in the TLB 23. This operation is called 'TLB refill'. Afterwards, when the TLB 23 is retrieved again, the required entry should be located and the TLB HIT for the TLB 23 becomes active. The data cache is then retrieved.

The hit entry of the TLB 23 includes a physical page number field, which becomes the upper bits of a physical address for the load instruction LCOM. These bits and the page offset in the virtual address storage unit 51, which becomes the lower bits of the physical address, are coupled together into a physical address storage unit 54.

The cache memory unit 55 has multiple entries, each including a valid, a tag (TAG), and a data field. The lower bits of the physical address is used as an INDEX key to retrieve in the cache. The tag (TAG) field value of the retrieved cache entry is compared with the TAG field, which includes the upper bits of the physical address. If the output of the match comparator 52 is '1' (indicating a match), and the valid field is '1' (valid), the output of the AND gate 53 becomes '1' indicating that a cache hit has occurred.

If there is no match with that entry, the CACHE HIT becomes '0' indicating a cache miss, the cache refill circuit 22 reads data out from the memory and then writes that data in the entry of the cache memory. Thereafter, when the cache is accessed again, a hit should occur in order to be able to output data.

Figure 13:
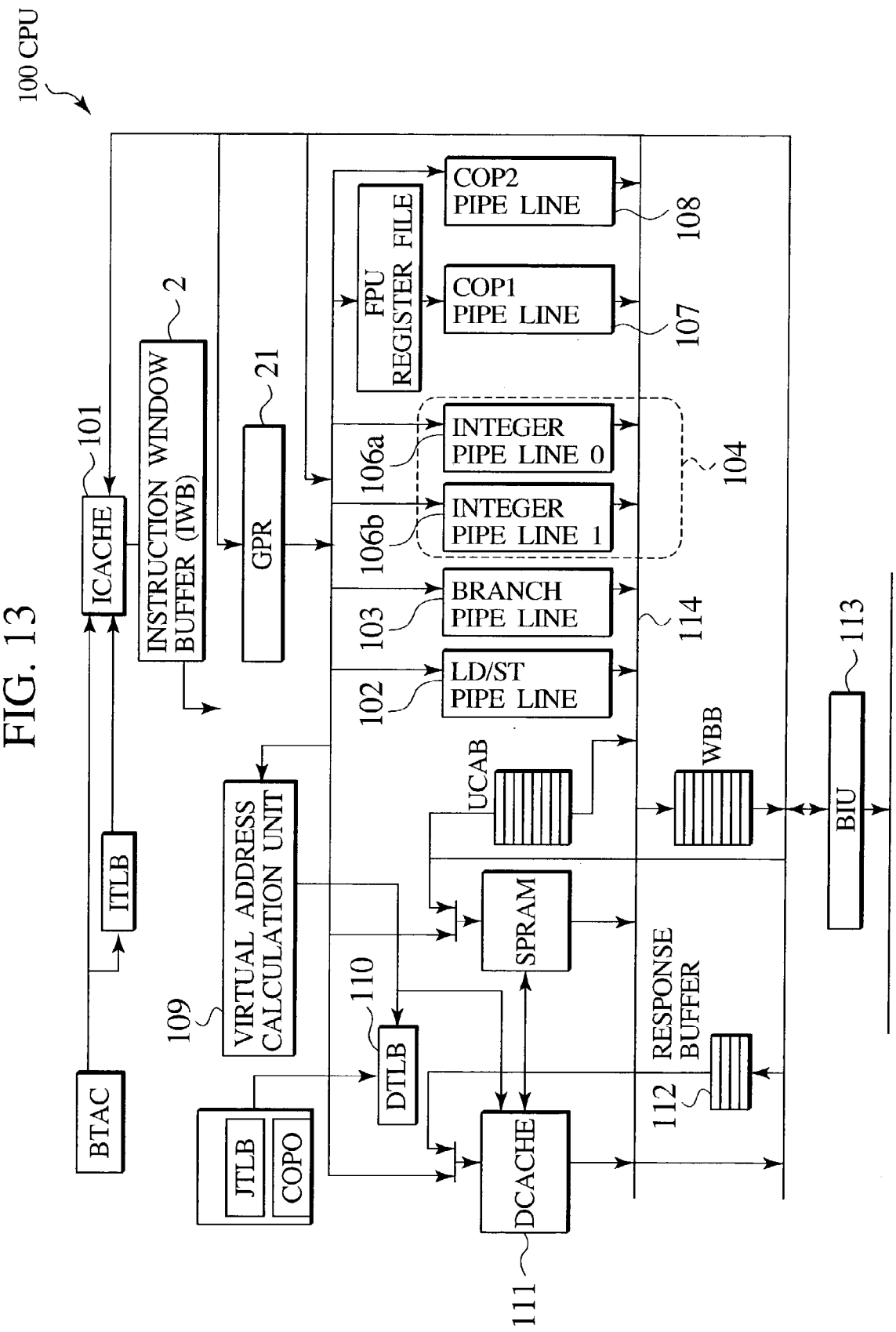
FIG. 13 is a diagram of a pipeline processing CPU in the instruction rollback processor system according to an embodiment of the present invention.

In the instruction rollback processor system according to an embodiment of the present invention, the configuration of a CPU that pipeline-processes is made up of an instruction cache (ICHACHE) 101, an IWB 2, which is connected to the instruction cache 101, a GPR 21, an execution pipeline, which includes an LD/ST pipe 102, a branch pipe 103, an integer pipe 0, an integer pipe 1, a COP1 pipe 107, and a COP2 pipe 108, a virtual address calculation unit 109, a DTLB (Data TLB) 110, a DCACHE (Data Cache) 111, a response buffer 112, and a bus interface unit (BIU) 113, as shown in FIG. 13. An instruction to be executed is read out from the instruction cache (ICACHE) 101. The read out instruction is written in the IWB 2. Next, the source register instruction values Rs and Rt designated in an instruction are read out from the GPR 21. Next, the read out source register instruction value is transmitted to an execution unit (an execution pipeline). There are multiple execution pipelines, which include an LD/ST pipe 102 that executes load/store instructions, a branch pipe 103 that executes branch instructions, integer pipes 0 and 1 that execute integer calculation instructions, a COP1 pipe 107 that executes coprocessor 1 instructions, and a COP2 pipe 108 that executes coprocessor 2 instructions. An instruction to be executed along with a source register instruction value is transmitted to an appropriate execution pipeline. The LD/ST pipe 102 operates in conjunction with the virtual address calculation unit 109, the DTLB 110, and the DCACHE (Data Cache) 111. More specifically, the source register instruction value given from the GPR 21 is input to the virtual address calculation unit 109 and the virtual address for data in the virtual address storage unit 51 is then generated. Next, the DTLB 110 converts the virtual address in the virtual address storage unit 51 to a physical address in the physical address storage unit 54, and a load/store instruction is then executed by accessing the DCACHE 111. If a cache miss occurs, the physical address for a load instruction LCOM is transferred to the response buffer 112, and the BIU (Bus Interface Unit) 113 loads data to the external memory. The data read out from the external memory by the BIU 113 is written in the response buffer 112, and then written in the DCACHE 111. This operation is called 'cache refill operation'. After being written, the instruction that has resulted in an occurrence of a cache miss is executed again.

Next, each pipeline outputs the result in an instruction such as the calculation result or the loaded data to a result bus 114, that result is then written in the GPR 21, and the execution of the instruction is over.

In the rollback system of the present invention, in order to use conventionally implemented PLGs, regarding additional hardware, there is only the MUX 11 and corresponding control logic. Therefore, the entire system can be implemented with low costs.

Some of the entries of the IWB 2 do not need to be occupied for the rollback operation, and the IWB entries can be used for the purpose of essentially issuing instructions. Moreover, since the number of instructions that can be pre-fetched increases, instruction level parallelism (ILP) is used effectively and performance is enhanced.

Since it is not required to detect pipeline hazards (a data hazard, a resource hazard, and a control hazard) during the rollback operation, control operations are easier with low costs.

With the embodiments of the present invention, since conventional pipeline registers are used to occupy the IWB for issuing instructions and make good use of instruction level parallelism, an instruction rollback processor system that can be controlled easier with low costs, an instruction rollback method, and an instruction rollback program can be provided.

OTHER EMBODIMENTS

As described above, while the present invention is described based on the embodiments, it should not be understood that the description and drawings that support part of this disclosure limit the present invention. This disclosure will manifest a variety of substitutes for the embodiments, working examples, and operating techniques for those skilled in the art. Therefore, the scope of the present invention should be defined with only invention-specific items based on the section of what is claimed is, which is appropriate from the above description.

Various modifications will become possible for those skilled in the art after receiving the teachings of the present disclosure without departing from the scope thereof.

It is apparent that the present invention should cover a variety of embodiments or the like not described herein. Therefore, the scope of the present invention should be defined with only the following claims.

What is claimed is:

1. An instruction rollback processor system comprising:
    an instruction window buffer, storing a plurality of instructions not yet executed and arranged in a predetermined order;
    a multiplexer receiving an output of the instruction window buffer;
    a rollback unit connected between the output side of the multiplexer and another input of the multiplexer; and
    a decoder unit connected to the rollback unit,
    wherein the rollback unit comprises a first instruction decoder decoding an instruction from a first pipeline register assigned in a plurality of pipeline registers.

2. The instruction rollback processor system of claim 1, further comprising a control unit connected to the decoder unit.

3. The instruction rollback processor system of claim 2, further comprising a rollback control unit connected to the control unit issuing a rollback control signal to the multiplexer.

* * * * *